United States Patent
Kurtz et al.

(10) Patent No.: US 9,050,535 B2
(45) Date of Patent: Jun. 9, 2015

(54) IMPLEMENTING CHALLENGES IN SINGLE-PLAYER GAMES

(75) Inventors: Daniel T. Kurtz, Campbell, CA (US); Nathan D. Taylor, Scotts Valley, CA (US); Samir Bajaj, Cupertino, CA (US); Amol Pattekar, San Jose, CA (US); Liam A. Weiner, San Francisco, CA (US); Christina E. Warren, San Jose, CA (US)

(73) Assignee: Apple Inc., Cupertino, CA (US)

( * ) Notice: Subject to any disclaimer, the term of this patent is extended or adjusted under 35 U.S.C. 154(b) by 58 days.

(21) Appl. No.: 13/492,697

(22) Filed: Jun. 8, 2012

(65) Prior Publication Data

US 2013/0331158 A1    Dec. 12, 2013

(51) Int. Cl.
*A63F 9/24*    (2006.01)
*A63F 13/30*    (2014.01)
*A63F 13/00*    (2014.01)

(52) U.S. Cl.
CPC ........... *A63F 13/12* (2013.01); *A63F 2300/556* (2013.01); *A63F 2300/558* (2013.01); *A63F 2300/61* (2013.01); *A63F 13/005* (2013.01)

(58) Field of Classification Search
USPC .......................................................... 463/42
See application file for complete search history.

(56) References Cited

U.S. PATENT DOCUMENTS

| 2008/0113805 A1* | 5/2008 | David et al. ..................... 463/42 |
| 2009/0111581 A1 | 4/2009 | Ostergren et al. |
| 2009/0176557 A1 | 7/2009 | Hall et al. |
| 2010/0009750 A1 | 1/2010 | Egozy et al. |
| 2010/0137049 A1 | 6/2010 | Epstein |
| 2010/0216553 A1* | 8/2010 | Chudley et al. .................. 463/42 |
| 2013/0288788 A1* | 10/2013 | Lim et al. ........................ 463/31 |

FOREIGN PATENT DOCUMENTS

| EP | 2008698 A1 | 12/2008 |
| WO | WO 03/068325 A2 | 8/2003 |

OTHER PUBLICATIONS

AddictingGames: Help Center (http://www.addictinggames.com/help/help.jsp) Jun. 1, 2012.
The Best Parts of Need for Speed's Autolog Hit the Slopes—SSX—XBox   (http://www.gameinformer.com/games/ssx/b/xbox360/archive/2011/08/19) Aug. 19, 2011.

(Continued)

*Primary Examiner* — Reginald Renwick
(74) *Attorney, Agent, or Firm* — Blakely, Sokoloff, Taylor & Zafman LLP (57) ABSTRACT

A method of implementing challenges in single-player games starts with a server receiving a challenge from a first mobile device and transmitting the challenge to a second mobile device. The challenge may include a high score or an achievement of a single-player game obtained on the first mobile device. The server may determine that a new high score is obtained on the second mobile device that is equal or greater than the high score included in the challenge or that the achievement is completed on the second mobile device. The server may then transmit a notification to the first mobile device that the challenge has been completed. If the server determines that the new high score is obtained, the notification may include a new challenge from the second mobile device to the first mobile device and the new challenge may include the new high score. Other embodiments are also described.

36 Claims, 4 Drawing Sheets

(56) References Cited

OTHER PUBLICATIONS

Caemgen: The Personal Blog (http://www.caemgen.nl/2012/03/12/some-changes-to-the-playstation-vita-l-would-love-to-see) Mar. 12, 2012.

Xbox—Live http://www.xbox.com/en-US/live/games.

Motorstorm—Radio Controlled Off Road Racing http://www.motorstorm.com/community.

PCT International Search Report and the Written Opinion of the International Searching Authority for PCT/US2013/039345, mailed Aug. 27, 2013.

PCT International Preliminary Report on Patentability for PCT/US2013/039345 mailed Dec. 18, 2014.

* cited by examiner

IMPLEMENTING CHALLENGES IN SINGLE-PLAYER GAMES

FIELD

An embodiment of the invention relate generally to the implementation of challenges in single-player games on mobile devices.

BACKGROUND

Currently, in addition to desktop computers and video game consoles, a wide range of portable consumer electronics may be used to play video games. These portable consumer electronics may include, for example, smart phones, laptops, notebooks, tablet computers, and personal digital media players.

All types of video games are available to be played by users on their portable consumer electronics including, for example, racing games like Crash Bandicoot Nitro Kart 2™, strategy puzzle games such as Angry Birds™ and Chu Chu Rocket™, and trivia games like You don't know Jack™. Many of these video games are games that can only be played by one player, known as single-player games.

SUMMARY

In order to provide single-player games with the same competitive aspect present in multi-player games, one embodiment of the invention allows for a user that is playing a single-player game on his mobile device to submit a challenge to another user that is playing the same single-player game on another mobile device. The challenge may be any objective to be accomplished in the single-player game. The challenge may also be any objective to be accomplished in a plurality of games (single or multiplayer).

In one embodiment of the invention, a method of implementing challenges in single-player games starts with a server receiving a challenge from a first device and transmitting the challenge to a second device. The challenge may include a high score of a single-player game obtained on the first device or an achievement of the single-player game obtained on the first device. The server may determine that a new high score is obtained on the second device that is equal or greater than the high score included in the challenge or that the achievement is completed on the second device. The server may then transmit a notification to the first device that the challenge has been completed. In some embodiments, if the server determines that the new high score is obtained, the notification to the first device includes a new challenge from the second device to the first device and the new challenge includes the new high score.

In another embodiment of the invention, an apparatus that implements challenges in single-player games includes a storage, a communication interface, and a processor. The communication interface may receive a challenge from a first device and transmit the challenge to a second device. The challenge may include a high score of a single-player game obtained on the first device or an achievement of the single-player game obtained on the first device. The processor that is coupled to the storage and the communication interface may determine that the challenge has been completed by determining that a new high score is obtained on the second device that is equal or greater than the high score included in the challenge or that the achievement is completed on the second device. When the processor determines that the challenge is completed on the second device, the communication interface may transmit a notification to the first device to indicate that the challenge has been completed. In some embodiments, if the processor determines that the new high score is obtained, the notification to the first device includes a new challenge from the second device to the first device, the new challenge including the new high score.

In yet another embodiment of the invention, a system that implements challenges in single-player games comprises a plurality of devices including a first and second device, and a server that includes a storage, a communication interface, and a processor. The communication interface may receive a challenge from the first device and transmit the challenge to the second device. The challenge may include a high score of a single-player game obtained on the first device or an achievement of the single-player game obtained on the first device. The processor may be coupled to the storage and the communication interface and may determine that a new high score is obtained on the second device that is equal or greater than the high score included in the challenge or that the achievement is completed on the second device. When the processor makes this determination, the communication interface may transmit a notification to the first device that the challenge has been completed.

The above summary does not include an exhaustive list of all aspects of the present invention. It is contemplated that the invention includes all systems, apparatuses and methods that can be practiced from all suitable combinations of the various aspects summarized above, as well as those disclosed in the Detailed Description below and particularly pointed out in the claims filed with the application. Such combinations may have particular advantages not specifically recited in the above summary.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one. In the drawings.

DETAILED DESCRIPTION

In the following description, numerous specific details are set forth. However, it is understood that embodiments of the invention may be practiced without these specific details. In other instances, well-known circuits, structures, and techniques have not been shown to avoid obscuring the understanding of this description.

Figure 1:
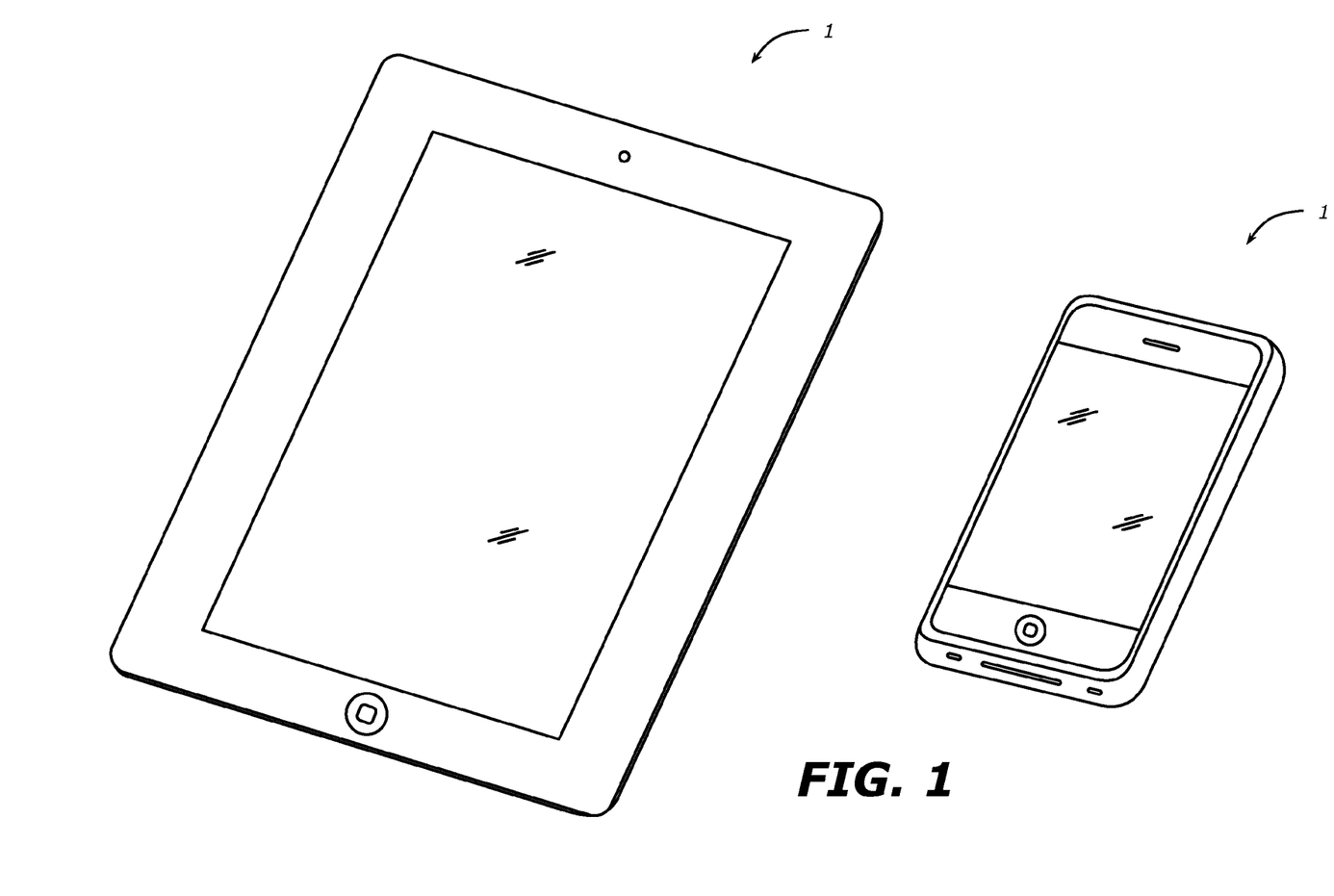
FIG. 1 illustrates examples of portable consumer electronic devices used in a network system according to one embodiment of the invention.

FIG. 1 illustrates examples of a portable consumer electronic device (or "mobile device") that is used in a network system according to one embodiment of the invention. As shown in FIG. 1, the mobile device 1 may be a mobile telephone communications device or a smartphone such as an iPhone™ device, from Apple Inc. of Cupertino, Calif., or a tablet computer such as an iPad™ device, from Apple Inc. of Cupertino, Calif. The mobile device 1 may also be a personal digital media player such an iPod™ device or a notebook computer such as a MacBook Air™ device, which are all from Apple Inc. of Cupertino, Calif.

A device housing (also referred to as the external housing) encloses a plurality of electronic components of the device 1. For example, the device 1 may include electronic components such as a processor, a data storage containing an operating system and application software for execution by the processor, input-output devices such as a display screen that may be a touch-sensitive screen ("touch screen"), a microphone port, and speaker ports, and a plurality of sensors such as ambient light sensors, an accelerometer, and a proximity sensor. Input-output devices may also include wireless communications devices having communications circuitry such as radio frequency (RF) transceiver circuitry, antennas, etc. . . . In one embodiment, the microphone port and the speaker ports may be coupled to the communications circuitry to enable the user to participate in wireless telephone or video calls. A variety of different wireless communications networks and protocols may be supported in the mobile device 1. These include: a cellular mobile phone network (e.g. a Global System for Mobile communications, GSM, network), including current 2G, 3G and 4G networks and their associated call and data protocols; and an IEEE 802.11 data network (WiFi or Wireless Local Area Network, WLAN).

The mobile device 1 may have video games installed therein. When a video game is executed by the processor of the device 1, the graphical user interface (GUI) of the game is displayed to the user. The user may interact with the video game by using the touch-screen of the device 1 or by manipulating the mobile device 1 in a manner that the sensors in the mobile device provide corresponding inputs to the game. While FIG. 1 illustrates examples of mobile device 1, it is understood that embodiments of the invention may also be implemented in a non-mobile device such as a compact desktop computer such as an iMac™, from Apple Inc. of Cupertino, Calif.

Figure 2:
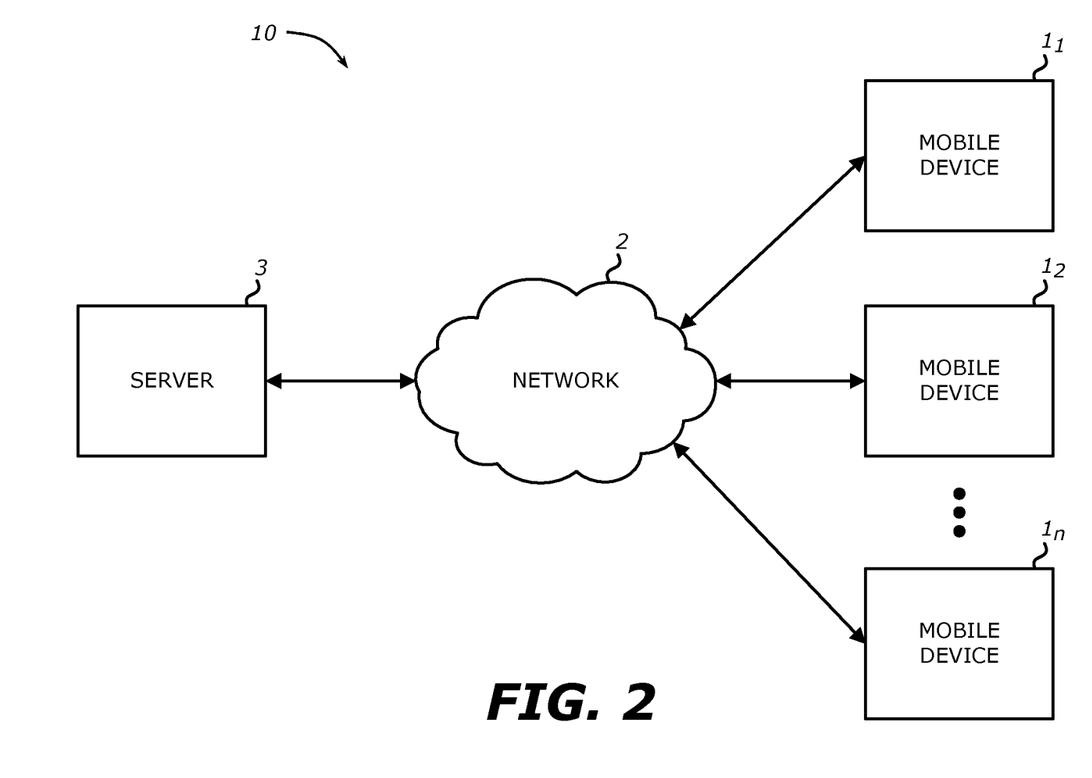
FIG. 2 shows a network system according to one embodiment of the invention.

FIG. 2 shows a network system according to one embodiment of the invention. The system 10 may be a networked system that includes a plurality of mobile devices $1_1$-$1_n$ (n>1) coupled to a server 3 via a trusted and/or un-trusted network 2. The network 2 may be physically located in a secure location to be trusted or may be trusted according to secure connections based on cryptographic protocols, e.g., SSL (Secure Socket Layer), PVN (Private Virtual Networking), or other connections. The network 2 may be a cellular mobile phone network (e.g. a Global System for Mobile communications, GSM, network), including current 2G, 3G and 4G networks and their associated call and data protocols; and an IEEE 802.11 data network (WiFi or Wireless Local Area Network, WLAN).

In one embodiment, a first user using a mobile device $1_1$ and a second user using mobile device $1_2$ are playing a single-player video game on their respective devices. The first user may provide a challenge to the second user by inputting the challenge on mobile device $1_1$. The challenge may be any objective that is provided from the first user to the second user. The challenge may be a leaderboard challenge (or score challenge) or an achievement challenge.

In the case of a leaderboard challenge, the first user obtains a personal high score on a game's ranked leaderboard and the first user challenges the second user to obtain a score that is equal or greater than the first user's personal high score. In some single-player games, the score may be, for example, a number of points accumulated in the course of playing the game. In other single-player games, a higher score is obtained for quickest game completion (e.g., a puzzle game or a maze game) or when the fastest time is obtained (e.g., a car racing game).

In the case of an achievement challenge, the first user completes an achievement in the game and challenges the second user to complete that same achievement in the game. For example, in a trivia game, the first user may have completed a first level of questions without getting any answers wrong and now challenges the second user to do the same. In another example, the first user may have gotten a bull's eye in a dart game and now challenges the second user to obtain a bull's eye as well.

In the case of both the leaderboard challenge and the achievement challenge, in some embodiments, the first user may also challenge the second user to obtain a high score or an achievement that the first user has not yet completed.

The challenge from the first user may be sent from mobile device $1_1$ to the server 3 via the network 2 and the server 3 then transmits the challenge to the second mobile device $1_2$. The second mobile device $1_2$ may display the challenge on the display screen to notify the user of the challenge. In some embodiments, the user is automatically opted-in to the challenge such that the user must decline the challenge to opt-out. When the server 3 determines that the second user completes the challenge, the server 3 may transmit a notification to the first mobile device $1_1$ that the second user has completed the challenge. In one embodiment, if the challenge is a leaderboard challenge, the notification being sent to the first mobile device $1_1$ may automatically include a new challenge from the second user to the first user to obtain a score that is equal or higher than the new score that the second user obtained to complete the original challenge from the first user.

Figure 3:
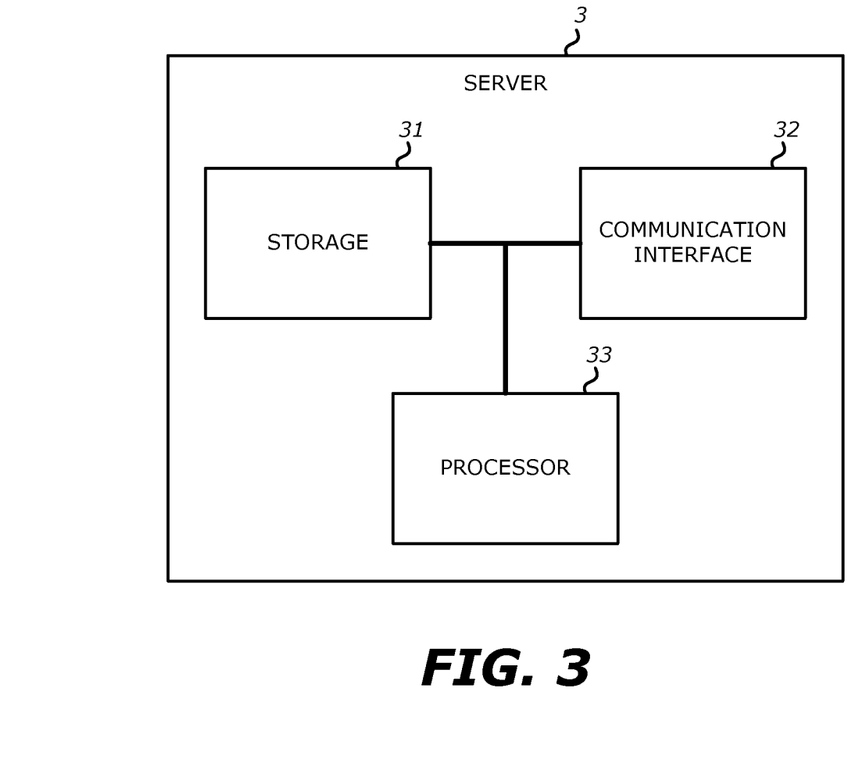
FIG. 3 shows a server according to one embodiment of the invention.

Referring to FIG. 3, the server 3 according to one embodiment of the invention is further illustrated. The server 3 may include a storage 31, a communication interface 32, and a processor 33.

The communication interface 32 may be an interface that is coupled to the network 2 in order to receive a challenge from the first device $1_1$ and transmit the challenge to the second device $1_2$. The challenge may be a leaderboard challenge that includes a high score of a single-player game obtained on the first device or may be an achievement challenge that includes an achievement of the single-player game obtained on the first device. In some embodiments, the challenge may be include a high score or an achievement that the first user has not yet obtained or completed. As the users play the games on their respective devices, the communication interface 32 may also receive scores obtained by the users, respectively, from the first mobile device $1_1$ and second mobile device $1_2$. The communication interface 32 may also receive the status of completion of achievements by the users, respectively, from the first and second devices. For instance, if the first user obtained a bull's eye in dart game, this achievement (i.e., the bull's eye) may be stored in the leaderboard.

As shown in FIG. 3, the storage 31 is coupled to the communication interface 32 and stores, for example, the challenges, the scores, and the status of completion of achievements received by the communication interface 32. The storage 31 may include one or more different types of storage such as hard disk drive storage, nonvolatile memory, and volatile memory such as dynamic random access memory. In some embodiments, the storage 31 stores a leaderboard of the video game. The leaderboard of the video game is a board that displays the rankings of a plurality of users that have the highest scores or points in the game. The storage 31 may also store a global leaderboard that aggregates points obtained in a plurality of games (e.g., gamer scores). In some embodiments, in addition to the points and the rankings of each of the users having the highest scores, the leaderboard and the global leaderboard may also include the status of completion of achievements for each user.

Referring to FIG. 3, the processor 33 may be coupled to the communication interface 32 and the storage 31. The processor 33 may be a microprocessor, a microcontroller, a digital signal processor, or a central processing unit. The term "processor" may refer to a device having two or more processing units or elements, e.g. a CPU with multiple processing cores. The processor 33 may be used to control the operations of server 3 by executing software instructions or code stored in the storage 31. In some embodiments, the processor 33 may determine that the second user has completed the challenge by reading the leaderboard or the global leaderboard stored in the storage 31. For example, the challenge from the first user to the second user is a leaderboard challenge to meet or beat the first user's score of 100. The processor 33 may read the score associated with the second user from the leaderboard of the game as being 105 and determine that the second user has completed the challenge. In another example, the challenge may include an achievement challenge from the first user to the second user obtain a bull's eye in the darts game. The processor 33 may read the bull's eye achievement as a completed achievement associated with the second user in the leaderboard for the darts game to determine that the second user has completed the challenge from the first user. When the processor 33 determines that the challenge is completed by the second user, the processor 33 may signal to the communication interface 32 to transmit the notification to the first mobile device $1_1$ that the challenge has been completed. The notification may be displayed on the display screen of the first device $1_1$ for the first user. In one embodiment, the notification is displayed as banner or a badge. The notification may also be displayed on the display screen when the user activates the single-player game in which the challenge was completed.

In one embodiment, if the challenge is a leaderboard challenge, the processor 33 may automatically generate a new challenge to be included in the notification being sent to the first mobile device $1_1$. The new challenge may be a challenge from the second user to the first user to obtain a score that is equal or higher than the new score that the second user obtained to complete the original challenge from the first user.

In other embodiments, the challenge from the first user to the second user may include both a leaderboard challenge and an achievement challenge. In this type of challenge, the processor 33 may signal to the communication interface 32 to transmit the notification to the first device $1_1$ when the second user completes both the leaderboard challenge and the achievement challenge. The processor 33 may consult the leaderboard of the game to determine when the second user completes both the leaderboard challenge and the achievement challenge.

In one embodiment, the challenge is based on a user's gamer score that appears in the global leaderboard. The gamer score is an aggregated score obtained in a plurality of games. For instance, the first user may have obtained 100 points in each three different games: Game A, Game B, and Game C. This provides the first user with a gamer score of 300 points. In this embodiment, the first user may challenge the user obtain a gamer score of 300 points. In order to complete this challenge, the second user does not necessarily need to obtain over 100 points in each of the games, Game A, B, and C, in order to complete the challenge. Instead, the second user may obtain a gamer score of 300 points or more in these three games (i.e., Games A, B, and C) or any other combination of games that is installed on the second mobile device $1_2$. The challenge that is based on the gamer score may also include a time frame that the second user has to meet this challenge.

In some embodiments, the first user does not have to have completed the challenge that he is presenting to the second user. Instead, the first user may submit a racing challenge to the second user. A racing challenge may include a score in a game ("racing score") or an achievement a game ("racing achievement") that the first and second users are going to race to complete. In this embodiment, the communication interface 32 of the server 3 receives the racing challenge including the racing score or the racing achievement from the first device $1_1$ and transmits the racing challenge to the second device $1_2$. In this embodiment, the processor 33 determines when a score that is equal or greater than the racing score is obtained by the first user or by the second user or when the racing achievement is completed by the first user or the second user. If the first user completes the racing challenge first, the processor 33 may signal to the communication interface 32 to transmit a notification to the second device $1_2$ that the first user completed the racing challenge first.

In another embodiment, the storage 32 may also store a challenge leaderboard that includes a percentage of completion of challenges received by each user. For example, if the first user received 100 challenges from various users on other mobile devices $1_2$-$1_n$ and has successfully completed 70 challenges out of the 100 challenges received, the challenge leaderboard will indicate that the first user has completed 70% of challenges received. In this embodiment, the first user may also submit a challenge to the second user that includes the 70% completion of challenges received. With this challenge, the first user challenges the second user to obtain a percentage of completion of challenges that is equal or greater than 70%. This challenge may also include a time frame that the second user has to meet this challenge.

In one embodiment, the first user may also include a wager in the challenge to the second user. The wager may be a number of points from the leaderboard of the game or a number of gamer points from the global leaderboard. For example, the first user may wager 100 points that are associated with the first user on the leaderboard of the game. In this example, if the second user is able to complete the challenge from the first user, the second user wins 100 of the first user's leaderboard points. Accordingly, if the challenge is completed by the second user, the processor 33 subtracts the 100 points associated with the first user in the leaderboard and adds the 100 points to the points associated with the second user in the leaderboard. Conversely, if the second user is not able to complete the challenge, the first user wins 100 points that are associated with the second user in the leaderboard of the game. Accordingly, the processor 33 adds 100 points to the points associated with the first user in the leaderboard and subtracts the 100 points from the points associated with the second user in the leaderboard.

The following embodiments of the invention may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a procedure, etc.

Figure 4:
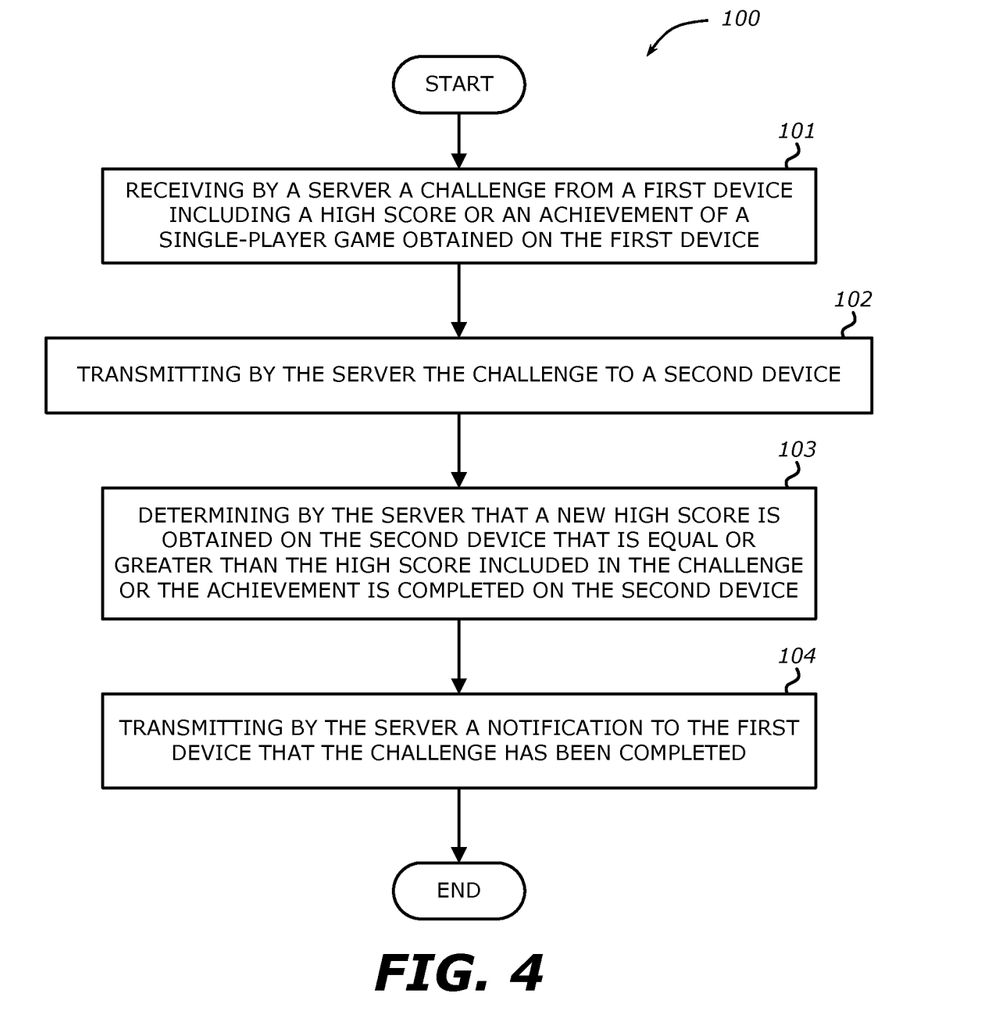
FIG. 4 illustrates a flow diagram of an example method of implementing challenges by a server according to one embodiment of the invention.

FIG. 4 illustrates a flow diagram of an example method of implementing challenges by a server according to one embodiment of the invention. Method 100 begins with a server receiving a challenge from a first device. The challenge may include a high score of a single-player game obtained on the first device when the challenge is a leaderboard challenge or an achievement of the single-player game obtained on the first device when the challenge is an achievement challenge (Block 101). At Block 102, the server then transmits the challenge to the second device. At Block 103, the server determines that the challenge has been completed on the second device. The server may determine that a new high score is obtained on the second device that is equal or greater than the high score included in the challenge or the server may determine that the achievement is completed on the second device. In some embodiments, the server makes this determination by reading the scores or the status of completion of achievements that are stored in the leaderboard or the global leaderboard. At Block 104, the server transmits to the first device a notification that the challenge has been completed. In some embodiments, if the challenge is a leaderboard challenge that includes the score of the first user ("high score") and the second user completes the challenge by obtaining a score ("new high score") that is equal or higher than the score of the first user, the notification being transmitted to the first device may further include a new leaderboard challenge from the second user to the first user. This new leaderboard challenge includes the new high score as the score that the first user has to meet or beat to complete the new challenge.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting. There are numerous other variations to different aspects of the invention described above, which in the interest of conciseness have not been provided in detail. Accordingly, other embodiments are within the scope of the claims.

The invention claimed is:

1. A method comprising:
   receiving by a server a challenge from a first mobile device, the challenge including a high score of a single-player game obtained on the first mobile device and an achievement of the single-player game obtained on the first mobile device, wherein the challenge includes the high score and the achievement of the game;
   transmitting by the server the challenge to a second mobile device;
   determining by the server that a new high score is obtained on the second mobile device that is equal or greater than the high score included in the challenge or that the achievement is completed on the second mobile device; and
   transmitting by the server a notification to the first mobile device that the challenge has been completed, the server including a challenge leaderboard comprising a percentage of completion of challenges received,
   wherein if the server determines that the new high score is obtained, the notification to the first mobile device includes a new challenge from the second mobile device to the first device, the new challenge including the new high score.

2. The method of claim 1, wherein the high score includes at least one of points obtained in the game, a quickest game completion, or a fastest time.

3. The method of claim 1, wherein the server includes a leaderboard of the game that includes the points obtained for the game or a global leaderboard that aggregates points obtained in a plurality of games, wherein the leaderboard and the global leaderboard store the high score, the new high score, and a status of completion of the achievement for the first and second mobile devices.

4. The method of claim 3, wherein determining by the server further comprises:
   reading by the server at least one of the high score, the new high score, or the status of completion of the achievement stored in the leaderboard or the global leaderboard.

5. The method of claim 1, wherein the server receives from the first and second mobile devices scores of the game obtained on the first and second mobile devices, respectively, and the status of completion of the achievement for the first and second mobile devices, respectively, wherein the scores include the high score and the new high score.

6. The method of claim 3, wherein the challenge includes a number of points from the leaderboard or the global leaderboard wagered by the first mobile device, and wherein when the server determines that the new high score is obtained on the second mobile device or that the achievement is completed on the second mobile device, the server subtracts the number of wagered points from the points associated with the first mobile device in the leaderboard or the global leaderboard and adds the number of wagered points to the points associated with the second mobile device in the leaderboard or the global leaderboard.

7. The method of claim 1, wherein determining by the server further comprises:
   determining that the new high score is obtained on the second mobile device that is equal or greater than the high score included in the challenge and that the achievement is completed on the second mobile device.

8. The method of claim 1, further comprising:
   receiving by a server a racing challenge from the first mobile device, the racing challenge including a racing score or a racing achievement;
   transmitting by the server the racing challenge to the second mobile device; and
   determining by the server when a score that is equal or greater than the racing score is obtained on the first mobile device or the second mobile device or when the racing achievement is completed on the first mobile device or the second mobile device.

9. The method of claim 1, wherein the server receives from the first and second mobile devices the status of completion of the achievement for the first and second mobile devices, respectively.

10. An apparatus comprising:
    a storage, the storage including a challenge leaderboard comprising a percentage of completion of challenges received;
    a communication interface
       to receive a challenge from a first mobile device the challenge including a high score of a single-player game obtained on the first mobile device and an achievement of the single-player game obtained on the first mobile device, wherein the challenge includes the high score and the achievement of the game,
       to transmit the challenge to a second mobile device, and
       to transmit a notification to the first mobile device that the challenge has been completed; and
    a processor coupled to the storage and the communication interface, the processor
       to determine that a new high score is obtained on the second mobile device that is equal or greater than the high score included in the challenge or that the achievement is completed on the second mobile device,
wherein if the processor determines that the new high score is obtained, the notification to the first mobile device includes a new challenge from the second mobile device to the first mobile device, the new challenge including the new high score.

11. The apparatus of claim 10, wherein the high score includes at least one of points obtained in the game, a quickest game completion, or a fastest time.

12. The apparatus of claim 10, wherein the storage includes a leaderboard of the game that includes the points obtained for the game or a global leaderboard that aggregates points obtained in a plurality of games, wherein the leaderboard and the global leaderboard store the high score, the new high score, and a status of completion of the achievement for the first and second mobile devices.

13. The apparatus of claim 12, wherein the processor determines that the new high score is obtained on the second mobile device or that the achievement is completed on the second mobile device by reading at least one of the high score, the new high score, or the status of completion of the achievement stored in the leaderboard or the global leaderboard.

14. The apparatus of claim 10, wherein the communication interface further receives from the first and second mobile devices scores of the game obtained on the first and second mobile devices, respectively, and the status of completion of the achievement for the first and second mobile devices, respectively, wherein the scores include the high score and the new high score.

15. The apparatus of claim 12, wherein the challenge includes a number of points from the leaderboard or the global leaderboard wagered by the first mobile device, and wherein when the processor determines that the new high score is obtained on the second mobile device or that the achievement is completed on the second mobile device, the processor subtracts the number of wagered points from the points associated with the first mobile device in the leaderboard or the global leaderboard and adds the number of wagered points to the points associated with the second mobile device in the leaderboard or the global leaderboard.

16. The apparatus of claim 10, wherein the processor further
determines that the new high score is obtained on the second mobile device that is equal or greater than the high score included in the challenge and that the achievement is completed on the second mobile device.

17. The apparatus of claim 10, wherein
the communication interface further receives a racing challenge from the first mobile device, the racing challenge including a racing score or a racing achievement, and transmits the racing challenge to the second mobile device; and
the processor further determines when a score that is equal or greater than the racing score is obtained on the first mobile device or the second mobile device or when the racing achievement is completed on the first mobile device or the second mobile device.

18. A system comprising:
a plurality of mobile devices including a first mobile device and a second mobile device;
a server comprising:
a storage, the storage including a challenge leaderboard comprising a percentage of completion of challenges received,
a communication interface
to receive a challenge from the first mobile device the challenge including a high score of a single-player game obtained on the first mobile device and an achievement of the single-player game obtained on the first mobile device, wherein the challenge includes the high score and the achievement of the game,
to transmit the challenge to the second mobile device, and
to transmit a notification to the first mobile device that the challenge has been completed; and
a processor coupled to the storage and the communication interface, the processor
to determine that a new high score is obtained on the second mobile device that is equal or greater than the high score included in the challenge or that the achievement is completed on the second mobile device,
wherein if the processor determines that the new high score is obtained, the notification to the first mobile device includes a new challenge from the second mobile device to the first mobile device, the new challenge including the new high score.

19. A method comprising:
receiving by a server a challenge from a first mobile device, the challenge including an achievement of the single-player game obtained on the first mobile device;
transmitting by the server the challenge to a second mobile device;
determining by the server that the achievement is completed on the second mobile device, the server including a challenge leaderboard comprising a percentage of completion of challenges received; and
transmitting by the server a notification to the first mobile device that the challenge has been completed.

20. The method of claim 19, wherein determining by the server further comprises:
reading by the server the status of completion of the achievement stored in a leaderboard or a global leaderboard, wherein the leaderboard and the global leaderboard are stored in the server.

21. The method of claim 20, wherein the server includes the leaderboard or the global leaderboard to store a status of completion of the achievement for the first and second mobile devices.

22. A method comprising:
receiving by a server a challenge from a first mobile device, the challenge including a high score of a single-player game or an achievement of the single-player game, wherein the high score and the achievement have not been obtained on the first mobile device;
transmitting by the server the challenge to a second mobile device;
determining by the server that a new high score is obtained on the second mobile device that is equal or greater than the high score included in the challenge or that the achievement is completed on the second mobile device, the server including a challenge leaderboard comprising a percentage of completion of challenges received; and
transmitting by the server a notification to the first mobile device that the challenge has been completed.

23. The method of claim 21, wherein the server determines that the achievement is completed on the second mobile device.

24. The method of claim 19, wherein the server receives from the first and second mobile devices the status of completion of the achievement for the first and second mobile devices, respectively.

25. The method of claim 22, wherein the high score includes at least one of points obtained in the game, a quickest game completion, or a fastest time.

26. The method of claim 22, wherein the server includes a leaderboard of the game that includes the points obtained for the game or a global leaderboard that aggregates points obtained in a plurality of games, wherein the leaderboard and the global leaderboard store the high score, the new high score, and a status of completion of the achievement for the first and second mobile devices.

27. The method of claim 22, wherein the server receives from the first and second mobile devices scores of the game obtained on the first and second mobile devices, respectively, and the status of completion of the achievement for the first and second mobile devices, respectively, wherein the scores include the high score and the new high score.

28. A non-transitory computer readable medium comprising instructions which when executed by a processing system comprising one or more processors, executes a method, the method comprising:
  receiving by a server a challenge from a first mobile device, the challenge including an achievement of the single-player game obtained on the first mobile device;
  transmitting by the server the challenge to a second mobile device;
  determining by the server that the achievement is completed on the second mobile device, the server including a challenge leaderboard comprising a percentage of completion of challenges received; and
  transmitting by the server a notification to the first mobile device that the challenge has been completed.

29. The non-transitory medium of claim 28, wherein the server includes a leaderboard or a global leaderboard to store a status of completion of the achievement for the first and second mobile devices.

30. The non-transitory medium of claim 29, wherein determining by the server further comprises:
  reading by the server the status of completion of the achievement stored in the leaderboard or the global leaderboard.

31. The non-transitory medium of claim 28, wherein the server receives from the first and second mobile devices the status of completion of the achievement for the first and second mobile devices, respectively.

32. A non-transitory computer readable medium comprising instructions which when executed by a processing system comprising one or more processors executes a method, method comprising:
  receiving by a server a challenge from a first mobile device, the challenge including a high score of a single-player game or an achievement of the single-player game, wherein the high score and the achievement have not been obtained on the first mobile device;
  transmitting by the server the challenge to a second mobile device;
  determining by the server that a new high score is obtained on the second mobile device that is equal or greater than the high score included in the challenge or that the achievement is completed on the second mobile device, the server including a challenge leaderboard comprising a percentage of completion of challenges received; and
  transmitting by the server a notification to the first mobile device that the challenge has been completed.

33. The non-transitory medium of claim 32, wherein the high score includes at least one of points obtained in the game, a quickest game completion, or a fastest time.

34. The non-transitory medium of claim 32, wherein the server includes a leaderboard of the game that includes the points obtained for the game or a global leaderboard that aggregates points obtained in a plurality of games, wherein the leaderboard and the global leaderboard store the high score, the new high score, and a status of completion of the achievement for the first and second mobile devices.

35. The non-transitory medium of claim 34, wherein the challenge includes a number of points from the leaderboard or the global leaderboard wagered by the first mobile device, and wherein when the server determines that the new high score is obtained on the second mobile device or that the achievement is completed on the second mobile device, the server subtracts the number of wagered points from the points associated with the first mobile device in the leaderboard or the global leaderboard and adds the number of wagered points to the points associated with the second mobile device in the leaderboard or the global leaderboard.

36. The non-transitory medium of claim 32, wherein the server receives from the first and second mobile devices scores of the game obtained on the first and second mobile devices, respectively, and the status of completion of the achievement for the first and second mobile devices, respectively, wherein the scores include the high score and the new high score.

* * * * *